Nov. 13, 1962    W. J. ZUBRISKY    3,063,763
CHROMIUM BEARING SURFACE
Filed Dec. 2, 1958

INVENTOR
WILLIAM J. ZUBRISKY
BY
Burgess, Ryan, & Hicks
ATTORNEYS

United States Patent Office 3,063,763
Patented Nov. 13, 1962

3,063,763
CHROMIUM BEARING SURFACE
William J. Zubrisky, Waterbury, Conn., assignor to Chromium Corporation of America, New York, N.Y., a corporation of Delaware
Filed Dec. 2, 1958, Ser. No. 777,622
5 Claims. (Cl. 308—241)

The present invention relates to chromium bearing surfaces for cylinder liners, cylinder bores, shafts or the like. It relates, more particularly, to chromium bearing surfaces of a type which contains lubricant retaining pockets in the form of discrete pits or depressions which are separated by surfaces of hard, dense chromium.

An object of the present invention is to provide a chromium bearing surface which has quick "break-in" characteristics while retaining the excellent wearing qualities or long life of such a surface. It has long been recognized that the life of bearing surfaces in cylinder liners, cylinder bores or the like in conjunction with which pistons or other moving parts operate, can be greatly increased by providing such surfaces with a layer of chromium. However, such a surface, especially where the chromium is highly polished, has a tendency to gall, seize or score and it is difficult to keep such a surface properly lubricated because of the poor oil-retention properties of chromium. To overcome these difficulties, chromium bearing surfaces have been provided with numerous small pockets in the form of pits or depressions adapted to retain small amounts of lubricant which will be spread onto adjoining contact areas or lands by relative movement between the bearing surface and an opposing surface.

There are several ways of producing such lubricant retaining pockets in a chromium bearing surface and the present invention is particularly directed to such surfaces which contain discrete pockets or depressions and the surfaces of the contact areas or lands which separate such pockets or depressions from unfissured load-bearing surfaces of hard, dense chromium in contrast with chromium bearing surfaces containing pockets or depressions produced by subjecting the entire surface to what is known as reverse-current etching. Reverse-current etching causes the chromium surface to disintegrate and soften to some extent which affects its wearing qualities. It also generally produces intercommunicating pockets or depressions.

Examples of chromium bearing surfaces to which the present invention is applicable are shown and described fully in U.S. Patent No. 2,248,530 which issued on July 8, 1941, to Granger et al. for Metal Article Having Antifriction Surface and U.S. Patent No. 2,620,296 issued December 2, 1952, to Wilsdon for Method of Electrolytically Coating and Etching Bearing Surfaces. The chromium bearing surfaces which are described and shown in these patents, need not be described in detail here except to note that, in both instances, the bearing surfaces contain discrete lubricant retaining pits or depressions which are separated by contact areas or lands having unfissured load-bearing surfaces of hard, dense chromium which assures long life and good wearing characteristics.

However, the long life and resistance to wear of the surfaces of such contact areas or lands has given rise to certain difficulties and has presented a problem which has remained unsolved for a number of years. For example, in the commercial production of cylinder liners for Diesel engines having chromium bearing surfaces of this character, the resistance of the lands or contact areas to wear has frequently caused the "breaking-in" period for such a liner to be unduly prolonged. As with all moving parts of this character, it is not possible as a practical matter to machine such parts to tolerances which will provide an exact fit and ordinarily, conformation of the parts is obtained during an initial period of actual operation which causes the parts to accommodate themselves to one another and to smooth out through wear any irregularities which could cause excessive clearance or points of no contact between the parts. This process of accommodation is generally referred to as "breaking-in" and it is generally accompanied by oil consumption which may be considerably in excess of normal and with some loss of power. Hence, it is highly desirable for economic reasons and to obtain proper operation of the engine or the like to shorten the "breaking-in" period as much as possible.

The present invention enables this objective to be achieved without interfering with or detracting from the long life or excellent wearing qualities of the homogeneous layer of hard, dense chromium on the surface of the contact areas or lands. Briefly, applicant has discovered that the "break-in" time required for a chromium bearing surface of the character described above can be materially shortened by providing the smooth unfissured chromium load-bearing surfaces of the contact areas or lands with a multitude of relatively small or minute irregularities or depressions which may be produced by blasting the bearing surface with a fine grit ranging from about 60 to 150 mesh in size. Such blasting is carried out after the chromium surface containing the pits or depressions has been honed to bring it to the desired dimensions and has thereafter been polished to produce bright smooth surfaces on the contact areas.

The blasting of the chromium surface causes displacement of the chromium and when such a surface is examined under high power magnification, it has a multitude of finely toothed projections having sharp raised edges which give it a roughened appearance. However, the physical properties or hardness of the chromium are not changed or affected in any way. From observation, it is believed that the sharp edges of the finely toothed projections which are produced in this manner on the surfaces of the contact areas or lands, have an abrasive action upon the surface of an opposing part such as a piston ring which is moved relative thereto and thus, quickly causes the surface of the opposing part to conform or accommodate itself to the bearing surface. In addition, the top edges of the projections are not supported except at their bases and being weakly supported are subject to some deformation which enables them to conform more readily to the contour of an opposing surface.

Due to variations which are inherent in any grit blasting procedure, it is not possible to give specific dimensions as to the depths or sizes of the tooth projections or irregularities which are produced by blasting a chromium surface in this manner. However, measurements made with a profilometer indicate that the irregularities produced by a 60 mesh grit will have an average depth of from 15 to 20 microinches on the basis of an arithmetic average and irregularities produced by a 120 mesh grit will have an average depth of from 7 to 9 microinches on the same basis. In any event, it will be understood that the term relatively small or minute as used herein is intended to define irregularities or depressions which are generally of the size and depth produced by blasting a smooth unfissured chromium load-bearing surface with grits of a type such as alumina, silicon carbide or the like which range in size from 60 to 150 mesh. The term grit blasting as used herein will be understood to mean blasting with grit of this character.

To aid in understanding the invention more clearly, representations of chromium bearing surfaces embodying the invention are shown in the accompanying drawing in which.

Figure 1:
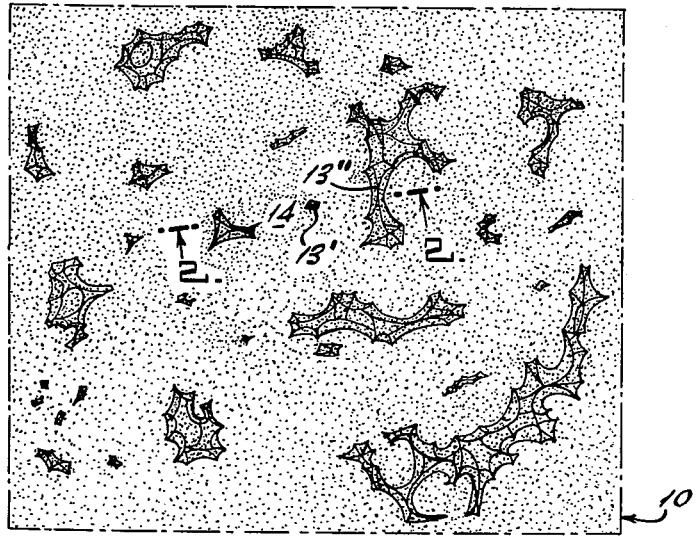
FIG. 1 is a plan view of a portion of chromium bearing surface embodying the invention and which is shown on a greatly magnified scale.

It will be understood that the surfaces shown in the drawing are mere representations for descriptive purposes only and that they are not intended to portray actual or comparative dimensions.

Figure 2:
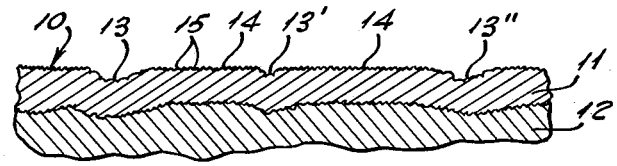
FIG. 2 is a section view taken along the line 2—2 of FIG. 1.

The bearing surface 10, shown in FIGS. 1 and 2, comprises a layer of chromium 11 which has been applied to the roughened surface of a metal base 12 in accordance with the teachings of Patent No. 2,248,530 referred to above. This surface contains discrete lubricant retaining pockets 13, 13', 13", etc., of varying sizes and shapes which are distributed more or less at random and which are separated by intervening contact areas or lands 14 having unfissured load-bearing surfaces of hard, dense chromium which have been honed and polished to bring the surface to the desired dimension.

Figure 3:
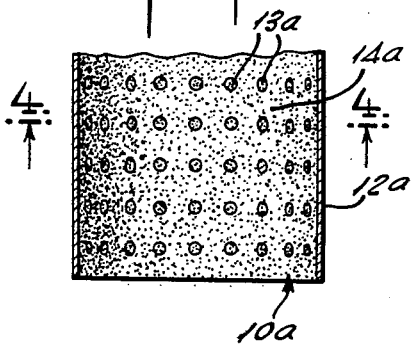
FIG. 3 shows in sectional elevation part of a cylinder liner having a chromium bearing surface embodying the invention.
Figure 4:
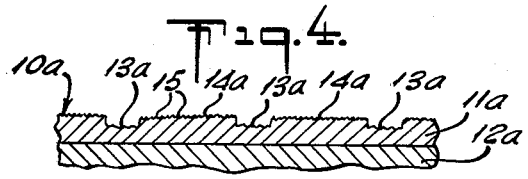
FIG. 4 is a fragmentary view in section taken along the line 4—4 of FIG. 3, but on a greatly enlarged scale.

The bearing surface 10a, illustrated in FIGS. 3 and 4, comprises a layer of chromium 11a applied to the surface of a metal base 12a containing discrete lubricant retaining pockets 13a therein which have been formed by reverse-current etching in accordance with the teachings of Patent No. 2,620,296 referred to above. The pockets are formed by reverse-etching through openings in a mask and the intervening contact areas or lands 14a are not affected by such etching and have unfissured load-bearing surfaces of hard, dense chromium.

After the usual honing, polishing and cleaning, the bearing surfaces 10 and 10a are grit blasted or mechanically roughened so that relatively small irregularities or tooth-like projections 15 having sharp edges are formed in the chromium on the surfaces of the contact areas or lands. Grit ranging in size from 60 to 150 mesh will produce irregularities or projections which are satisfactory as to depth and size.

The blasting may be carried out in any of several well-known ways. For example, the grit particles may be entrained in a stream of high-pressure air which is directed against the surface to be pitted or a centrifugal impeller may be employed to throw the grit against the surface. A centrifugal impeller is particularly well suited for use in blasting the interior cylinder liners and the like. However, for flat or irregular surfaces, other methods of grit blasting may be more suitable.

Specific examples of practicing the invention are as follows:

A cylindrical diesel engine cylinder liner, 22" long, with an inside diameter of 9.014" was interiorly blasted with #12 alumina grit, to provide a roughly pitted surface. This was then plated with about 0.008" of chromium, so that the inside diameter was reduced to 8.998". The interior surface of the liner was then trued and the inside diameter enlarged to 9.000" by a honing operation. The honed surface was then polished to produce a bright surface, which had in it a random pattern of discrete lubricant retaining pits with the pits occupying about 20% of the entire inner surface area. The liner was then mounted in an apparatus which included a centrally-located rotor 7" in diameter, provided with means for the supply of grit to its center, and with means for motion of the rotor axially of the liner. The rotor was turned at a speed of 5,000 r.p.m., while 120 mesh alumina grit was fed to the rotor at the rate of 100 pounds per minute, for a total of 65 seconds. At the end of this time, the interior of the liner had a bearing surface corresponding generally to that shown in FIGURES 1 and 2.

In another instance, the interior of a cylinder 32" long with a 12.014" inside diameter was chromium plated until its inner diameter was reduced to about 11.998". It was then honed to an inner diameter of 12.000" and a series of pockets was etched into this surface according to the teachings of U.S. Patent 2,620,296. The liner was then mounted in an apparatus similar to that referred to in the first example, except that the rotor speed was increased to 5,500 r.p.m. and silicon carbide grit of 80 mesh was fed to the rotor at the rate of 150 pounds per minute while the rotor was moved axially from one end of the liner to the other over a total time of 80 seconds. At the end of this treatment the interior of the liner had a bearing surface corresponding to that shown in FIGURES 3 and 4.

In this case, it was found that the blasting removed from the pockets soft or loose particles or chromium caused by the reverse-current etching and thus eliminated a possible cause of scoring or damage to the bearing surface.

It will be seen from the foregoing that a bearing surface embodying the invention comprises a homogeneous layer of hard chromium containing discrete lubricant-retaining pockets separated by contact areas or lands having unfissured load-bearing surfaces of hard, dense chromium each of which contains a multitude of very fine depressions or irregularities, most of which are rimmed by minute raised edges forming a very finely abrasive surface.

It will be understood that various changes and modifications may be made in the examples and embodiments of the invention shown and described herein without departing from the scope of the following claims.

I claim:

1. A bearing surface having improved break-in characteristics and subsequent long life which comprises a layer of chromium containing a plurality of discrete lubricant-retaining pockets and load-bearing areas extending between and isolating said pockets, said load-bearing areas presenting contact surfaces of solid unfissured chromium having a multitude of closely-spaced minute projections formed thereon by blasting the entire surface of the chromium layer with a hard abrasive grit ranging in size from 60 to 150 mesh, said projections having sharp upper edges positioned in opposing relation to a surface contacting therewith.

2. A bearing surface having improved break-in characteristics and subsequent long life which comprises a layer of chromium the surface of which contains a plurality of discrete lubricant-retaining pockets and load-bearing areas extending between and isolating lubricant-retaining pockets, said load-bearing areas having exposed contact surfaces of solid unfissured chromium, each of said contact surfaces having a multitude of closely-spaced minute projections and depressions formed thereon, said projections having sharp upper edges engaging with and promoting conformation between the surfaces of the load bearing areas and an opposing surface.

3. In a bearing surface comprising a layer of chromium containing a plurality of discrete lubricant retaining pockets and load-bearing areas of solid unfissured chromium extending between and isolating said pockets, the improvement which comprises a roughened contact surface of solid unfissured chromium formed on each of said load-bearing areas, each of said roughened contact surfaces containing a multitude of minute projections and depressions, said projections having relatively sharp upper edges engaging with an opposing surface and promoting conformation between the surfaces of the load-bearing areas and the opposing surface.

4. In a bearing surface, the improvement as defined in claim 3 wherein the minute projections and depressions on the roughened contact surfaces correspond in size and shape to projections and depressions formed in a surface of solid unfissured chromium by blasting said surface with a hard abrasive grit ranging in size from 60 to 150 mesh.

5. A bearing surface having improved break-in characteristics and subsequent long life comprising a layer of chromium having discrete lubricant-retaining pockets formed therein and load-bearing areas having contact surfaces of solid unfissured chromium extending between and isolating said lubricant-retaining pockets which is characterized by said contact surfaces of solid unfissured chromium having a multitude of minute projections and depressions formed thereon, said projections having sharp upper edges engaging with an opposing surface and promoting conformation between the contact surfaces of the load bearing areas and the opposing surface.

References Cited in the file of this patent

UNITED STATES PATENTS

| | | |
|---|---|---|
| 2,248,530 | Granger | July 8, 1941 |
| 2,314,604 | Van der Horst | Mar. 23, 1943 |
| 2,412,698 | Van der Horst | Dec. 17, 1946 |
| 2,433,457 | Jarrett | Dec. 30, 1947 |
| 2,453,404 | Bohlman | Nov. 9, 1948 |
| 2,620,296 | Wilsdon | Dec. 2, 1952 |

FOREIGN PATENTS

| | | |
|---|---|---|
| 789,514 | Great Britain | Jan. 22, 1958 |